United States Patent Office 3,557,256
Patented Jan. 19, 1971

3,557,256
POWDER THERMOSETTING COMPOSITIONS BASED ON BULK POLYMERIZED POLYVINYL CHLORIDE AND POLYACRYLATE PLASTICIZER
Irving E. Muskat, Miami, Fla., assignor to C-J Corporation, a corporation of Delaware
No Drawing. Filed June 4, 1969, Ser. No. 830,550
Int. Cl. C08f 15/28
U.S. Cl. 260—884
22 Claims

ABSTRACT OF THE DISCLOSURE

Polyvinyl chloride products possessing thermoset characteristics and which are hard, strong and tough, are produced by curing under heat and pressure a powder in which a polyacrylate plasticizer is absorbed by particles of polymerized thermoplastic polyvinyl chloride free of emulsifying and suspending agents such as bulk polymerized polyvinyl chloride.

---

The present invention is directed to the production of plastic products based on particles of thermoplastic polyvinyl chloride polymers free of emulsifying and suspending agents which are utilized in the invention to provide cured products which, in comparison with unmodified polyvinyl chloride homopolymers, are more rigid, have greater heat resistance and less solubility in organic solvents and which are unusually strong and tough. In this way, materials are provided which are physically hard and strong but which, when impacted beyond their yield point, will deform in the manner of metal so as to enable structural utility. Properties of the type noted are unusual for plastic products of any chemical constitution, but they are particularly unusual for rigid polyvinyl chloride which, by itself, is normally hard and brittle, requiring extensive plasticization with flexibilizing materals. Moreover, polyvinyl chloride is usually formed in the presence of emulsifying agents and is particularly lacking in strength when the formed piece which is tested has been produced by compression molding.

In accordance with the invention, particles of polymerized thermoplastic vinyl chloride polymer free of emulsifying and suspending agents such as bulk polymerized polyvinyl chloride are intimately admixed with relatively small proportions of a low molecular weight polyester reaction product of alpha,beta-ethylenically unsaturated monocarboxylic acid with aliphatic polyhydric alcohol to produce a powder mixture which is initially dry or damp (the dampness may vanish slowly with time) in order to provide a powder which is preferably dry and in which the polyethylenic polyester is absorbed by the vinyl chloride polymer in curing relationship therewith as provided by the presence of free radical polymerization catalyst.

It is to be noted that polymerization of polyacrylates in appropriate physical association with polyvinyl chloride provides unique properties when the powders of the invention, in which the particles are free of emulsifying and suspending agents, are cured under heat and pressure. More particularly, application of pressure and temperature in excess of about 120° C. causes the production of hard and tough non-porous products which possess approximately two to three times the tensile strength previously contemplated for compression molded polyvinyl chloride products. Moreover, this unusual strength is provided in combination with unusual toughness and hardness so as to confer overall metal-like characteristics in cured polyvinyl chloride products which also possess increased heat distortion temperature and solvent resistance as the result of a thermosetting cure of the polyfunctional plasticizer.

Referring more particularly to the polyvinyl chloride polymers which are used, the polymerization is carried out in the absence of suspending agents, salts, emulsifiers, water or solvents and such polymerization is referred to herein as a bulk polymerization. This produces polymer particles which are free from surrounding layers of emulsifying or suspending agents which appear to interfere with the relatively small proportion of polyacrylate plasticizers which are relied upon herein. The term "bulk" polymer, as used herein, is intended to define polymer particles regardless of how made which are free of such interfering agents and which are commonly available today using bulk polymerization.

The polyvinyl chloride bulk polymers which are used in the invention are therefore known materials. Bulk polymerization of polyvinyl chloride has been known for some time, though processing difficulties have prevented large scale commercial production. At the present time, by one method, the bulk polymerization is carried out in two stages. In the first stage, seed polymer particles are first formed in the vinyl chloride monomer in a prepolymerizer vessel. After about 10% conversion of monomer to polymer, the seed particles are transferred to a second horizontal reactor where refluxing monomer and vigorous agitation enable the cooling requirements to be satisfied permitting the reaction to be carried out to a high degree of conversion. After polymerization is completed, unreacted monomer is flashed off and the polymer is recovered directly without any solvent or water being involved.

Bulk polyvinyl chloride polymers produced generally as described above are presently being manufactured by a large number of commercial organizations and are available in finely divided, particulate form with the particle size being generally sufficiently small to permit passage through a 60 mesh screen. While there is no theoretical limit on the fineness of the particle, most of the commercially available materials have a particle size such that the bulk of these are retained on a 120 mesh screen or on a 200 mesh screen.

The invention is particularly directed toward polyvinyl chloride homopolymers, but minor amounts of copolymerizable monomers may optionally be present, up to about 4%, without significantly destroying the homopolymeric property. Most notable among the monomers which may be copolymerized with the vinyl chloride is vinylidene chloride.

From the standpoint of molecular weight, the higher molecular weights are preferred in accordance with the invention, but the lower molecular weight materials are also useful. Thus, and using gel permeation chromotography, the molecular weight by number average may range from about 25,000 to about 80,000 and by weight average from about 60,000 to about 200,000, with all of these being useful in accordance with the invention, but with the preference being for the high molecular weight materials since these possess the greatest strength.

Bulk polyvinyl chloride polymer has previously been evaluated at length in comparison with suspension resins and the strength properties of the two have been concluded to be approximately comparable. Thus, and as reported by Hooker Chemical Corporation in their publication entitled "Bulk vs. Suspension Polyvinyl Chloride Polymers" at page 13: "The information gathered on heat deflection temperature and impact strength shows the bulk polymers to be essentially equivalent to the suspension resins." This is why the two to three-fold increase in tensile strength and the vast improvement in impact resistance acheived by the present invention is so very surprising.

Using conventional plasticizers, tensile strength for molded products only increase modestly (about 25%)

when the bulk polymer is used with the increased strength being accompanied by increased flexibility (elongation). This is reported at page 18 of said publication using 45 parts of butyl benzyl phthalate per hundred parts of polyvinyl chloride resin.

The systems of the invention are unique in providing a combination in which a hardening and toughening thermosetting plasticizer is retained in the polymer particle during compression molding in order that a homogeneous polymerized product might be obtained to provide enormously enhanced strength in a product whcih is hard and tough.

The invention employs certain selected polyethylenic plasticizers which are low molecular weight polyester reaction products of alpha,beta-unsaturated monocarboxylic acid such as acrylic acid, chloroacrylic acid, bromoacrylic acid, alkoxy acrylic acid (methoxy or butoxy), alkyl, aryl or acyl acrylic acid (methacrylic acid, phenylacrylic acid and crotonic acid) with an aliphatic polyhydric alcohol such as ethylene glycol, propylene glycol, n-butylene glycol, isobutylene glycol, 1,3-butylene glycol, 1,5-pentane diol, diethylene glycol, dipropylene glycol, trimethylol propane, glycerine, pentaerythritol, etc., the polyhydric alcohol having a molecular weight below 600, preferably below about 400, to provide a low molecular weight polyester having a plurality of highly reactive ethylenic groups per molecule and which, while incapable of dissolving the polyvinyl chloride at temperatures of about room temperature is, nonetheless, capable of solvating the polyvinyl chloride polymer at elevated temperatures.

Typical reactive plasticizers in accordance with the invention are exemplified by ethylene glycol dimethacrylate, propylene glycol dimethacrylate, diethylene glycol dimethacrylate, 1,3-butylene glycol dimethacrylate, 1,5-pentane diol dimethacrylate and trimethylol propane trimethacrylate. Similarly, the acrylate and chloroacrylate and other alpha-substituted acrylic acid esters may be used.

The invention particularly prefers polyester reaction products which contain an average of more than two unsaturated ester groups per molecule since these enable the greatest increase in solvent resistance and heat distortion temperature and the most rapid acquisition of such properties. Thus, trimethylol propane trimethacrylate and pentaerythritol tetramethacrylate are particularly preferred and similar polyesters of higher functional alcohols are also contemplated such as dipentaerythritol and other polyhydroxy compounds containing a large number of reactive hydroxy groups.

The polyethylenic polyester plasticizers which are used in the invention, and which may be broadly referred to as polyacrylates, are preferably liquid, but this is not essential since mild heat can be used to melt the normally solid polyacrylates. Pentaerythritol tetramethacrylate is solid at room temperature and can be used.

The bulk polyvinyl chloride polymers used in the invention absorb the polyacrylate plasticizer with great rapidity. Thus, and while the maximum proportion of plasticizer which can be absorbed in a dry powder will vary somewhat depending on the plasticizer selected, and the molecular weight and particle size of the bulk polymer, up to about a weight ratio of about 25/75 (plasticizer to polymer) can be tolerated before wettish or fluid conditions are encountered. Even so, at a weight ratio of 20/80, the mixture is normally dry as soon as blending is completed. When the mixture is damp when blending is complete, it dries very slowly indicating that very little plasticizer is absorbed above that amount which is absorbed quickly. If the initial mixture possesses any significant wetness, it will not dry readily.

The need to absorb the polyacrylate plasticizer into the bulk polymer granules to form a dry powder prior to use is illustrated by the molding of mixtures which are initially damp but which will dry upon standing for a period of weeks. If the damp mixture is molded, the product is not homogeneous with polyacrylate separating from the granules of polyvinyl chloride and the toughness of the product is impaired. After the damp mixture has dried, molding produces molded products which are uniform and much stronger and tougher. On the other hand, the damp mixtures can be effectively used by gelling the same using mild pressure and temperature sufficient to cause the polyvinyl chloride particles to coalesce with one another to thereby stabilize the polyacrylate plasticizer within a homogeneous polyvinyl chloride matrix and prevent undesirable separation upon subsequent application of full molding pressures. The pregelling of mixtures during compression molding is of significance regardless of whether the powder is dry or damp as will be explained hereinafter.

Not only are the polyacrylate plasticizers rapidly absorbed and retained by the bulk polymer for the production of homogeneous cured products upon the application of heat and pressure, but other plasticizers behave differently since significant proportions of flexibilizing plasticizers destroy the essential hard and tough product character which is desired.

While the invention preferably relies upon powders which consist essentially of bulk polyvinyl chloride particles and polyacrylate plasticizer (preferably in dry mixture with one another) with only limited proportions of other agents such as catalysts, stabilizers, flow control agents, lubricants, and the like being present, polymerizable aromatic plasticizers such as styrene, vinyl toluene or ortho-chlorostyrene may also be present so long as the powdery character of the mixture is not altered. These polymerizable aromatic plasticizers are particularly well tolerated when the polyacrylate contains an average of more than two acrylate groups per molecule, or when the powder is pregelled under only moderate pressure, or when both of these expedients are employed to insure that the final cured product will be homogeneous in chemical constitution.

Thus, a 1:1 weight ratio mixture of styrene and trimethylol propane trimethacrylate has been used in place of the polyacrylate itself. When this proportion of styrene was used in admixture with butylene glycol dimethacrylate and molding heat and pressure applied, undesirable separation from the polyvinyl chloride particles took place. This undesirable separation did not occur with the mixture of styrene and more rapidly polymerizable and copolymerizable triacrylate. Accordingly, the proportion of styrene, vinyl toluene or orthochlorostyrene which may be used will depend on the polyacrylate selected, and more can be tolerated when polyacrylates containing an average of more than two acrylate groups per molecule are used.

Other monoethylenic monomers may also be used such as methyl methacrylate, but significant proportions of long chain acrylates or methacrylates will flexibilize the product, thus degrading the product.

It is stressed that the invention has as its purpose to provide a non-porous cured product which, in comparison with hard and brittle and very difficult to mold unmodified polyvinyl chloride homopolymer, is more rigid, has greater resistance to heat and less solubility in organic solvents. For this reason, the presence of any significant proportion of flexibilizing plasticizer in the mixtures of the invention not only disturbs the formation of the desired dry powders, but significantly prevents the achievement of the results desired herein.

Thus, the invention desires to physically combine strength and hardness with toughness. These are the characteristics of metal which enable structural utility as well as the forming of material by stamping. Brittle materials and flexible materials are completely inconsistent with this goal. Also, the invention desires to achieve this physical objective in combination with superior resistance to heat and solvent, properties inconsistent with the normal thermoplastic character of the base polyvinyl chloride, This is achieved in the invention because the superior physical and chemical characteristics both follow from the cure which is used.

Blending of the liquid and solid components in the invention may be carried out in any desired manner, but it is preferred that all of the ingredients to be blended, other than the polyvinyl chloride particles, be mixed together and then added to the polyvinyl chloride powder for thorough blending.

The mixtures of the invention are curable by application of heat and pressure using elevated temperature generally in excess of about 120° C. applied for appropriate periods of time with more time being needed at the lower curing temperature. Preferred mixtures are desirably cured at 165° C. for 1–2 minutes or at 145° C. for 2–3 minutes or at some combination of conditions intermediate those identified. Temperatures up to about 200° C. are broadly useful, though the highest temperatures cannot be maintained for long periods and stabilization against discoloration becomes more difficult.

Significantly, the dry powders of the invention can be heated to an intermediate temperature at which the powder particles solvate and merge to form a non-porous substantially uncured gel. Thus, at a powder temperature of about 100–120° C., the powder particles will flow and coalesce with one another under modest pressure (pressure required increasing with molecular weight and particle size). At such intermediate temperature, significant cure does not take place in the presence of a desirable free radical generating polymerization catalyst. It is more convenient to measure the temperature of the element which contacts the powder. Thus, if the powder is pressed against a heated surface at 165° C. for 10–15 seconds, a unitary gell product is obtained without significant polymerization. As the heating temperature is lowered, the time needed for coalescence of the particles is extended, as is the time required before significant polymerization takes place.

These gelled products are moldable by application of the curing conditions noted hereinbefore and plural layers can be laminated with one another or other lamina, or pieces or pellets of the gelled material can be loaded into a mold and molded to form a unitary product.

Thus, the gelled material can be cured directly; or shaped and formed and then cured; or cut-up as pellets and used as molding material. The powder or gelled pellets can be compression, transfer, extrusion, or injection molded (using machines designed for injection molding thermoset resins if desired). The cured sheets can be blow molded, or subjected to stamping forming at room or elevated temperature.

The thermosetting characteristics of these cured blends increase as the percentage of cross-linkable plasticizer is increased; and of course the ease of stamping or blow-molding will be increased as the temperature at which the operation is carried out is increased. The more thermoset the cured sheet, the higher its heat distortion point, and the higher the temperature required for ease of forming, stamping or blow-molding. Rigified foamed polyvinyl chloride products can also be made using the usual foaming agents, reference being made to commercial foaming agents such as Celogen AZ, Nitrosan, Unicel NP, etc.

This invention is particularly concerned with the economical production of molded pieces since, if structural elements are to be provided, the economic factors underlying production become significant.

It is normally necessary to cool a molded or extruded piece until it gains sufficient dimensional stability to be freed of support or to insure that cooling will be sufficiently uniform to avoid deforming the product or having it develop cracks and fissures. The development of thermosetting characteristics in the invention reduces the sensitivity of the formed piece to rapid cooling and dimensional stability as the elevated forming temperature is increased. This enables equipment without cooling facility or with only limited cooling facility to be used and speeds processing. The advantage is particularly apparent when the polyacrylate contains more than two acrylate groups per molecule since this leads to still higher heat distortion temperature and the more rapid development of high temperature dimensional stability.

The invention therefore provides uniquely superior molded products which benefit from the absence of emulsifying and suspending agents as is provided by the bulk polymer used, the thermoset character conferred by the polyacrylate, the hardness and toughness provided in combination, and these moldings can be provided more efficiently because they can be discharged from the mold while hot.

Of course one must use sufficient polyacrylate plasticizer to significantly modify the thermoplastic polyvinyl chloride polymer base material, and this is achieved using a weight ratio of plasticizer to polymer of at least about 3/97.

In accordance with a feature of the invention, the molding characteristics of the mixtures of the invention are improved, and particularly flow at lower molding pressure is improved, by incorporating in the mixture to be molded from 0.5–3%, based on the weight of the mixture, of a compatible nonpolymerizable plasticizer typified by alkyl esters of polycarboxylic acids, e.g., dialkyl ester of a phthalic acid in which the alkyl group contains at least 4 carbon atoms. Dioctyl phthalate in an amount of about 1% of the mixture is illustrative.

A futher feature of the invention is the compression molding of large pieces using the powders which have been described which may contain dispersed reinforcing fibers or not as desired. The production of such large pieces requires that the powder charged to the mold cavity flow extensively and, as indicated previously, a small amount of dioctyl phthalate or similar plasticizer is beneficial to the desired flow. On the other hand, the flowing molten material exerts little back pressure and air bubbles tend to become entrapped in the material being molded. This tendency is overcome in accordance with the invention by employing a two stage compression molding procedure.

In the first stage, the heated mold platens are closed at relatively low pressure (usually 50–300 p.s.i.) so that the desired flow and fluxing to shape the product and completely fill the mold can take place. The pressure is then released for about 5 seconds for removal of air; however, the mold remains essentially closed. Full molding pressure is then immediately applied for the required curing time.

During this first stage of the molding process (about 15–30 seconds at 165° C. with 2,5-dimethyl-2,5-bis(t-butyl peroxy) hexyne-3 as catalyst), it would appear that the molding composition fluxes at least in part without appreciable cure of the polymerizable plasticizer; thereby gelling at least the surface portions of the composition and providing a desired back pressure to permit air bubbles to be squeezed out. The pregelling stage will vary from 5–30 seconds at 165° C. with 2,5-dimethyl-2,5-bis (t-butyl peroxy)hexyne-3 as catalyst, depending on the thickness of the molded piece; with greater thickness longer time is desirable.

Fiber reinforcement, while not essential, adds desirably to the strength, particularly impact strength and usually to the heat resistance of the final cured product. For this purpose, fibers can be mixed in with the dry powders of the invention or with pellets of the gelled and uncured products derived therefrom. Also, sheets of gelled and uncured material can be laminated with fibrous reinforcing layers or the dry powders can be distributed over layers of fabric or fibrous matt.

Various fibrous materials may be incorporated and especially glass, which may be in woven or matt form. The fibers which may be used also include cotton, paper, wood fibers, nylon, metallic fibers, etc.

While numerous materials may be incorporated in the dry powders of the invention, such as dyes, pigments, lubricants, stabilizers, inhibitors, and other conventional additives, the most important component which should be present before the dry particles are gelled is free radical generating polymerization catalyst. The catalyst is preferably added to one or more of the liquid components before the solid components of the mixture are added. It has been found that ordinary free radical polymerization catalysts can be used but must be chosen so that they will retain their activity despite elevated temperature gelling and subsequent prolonged storage. Moreover, the flexible solid gels which are formed as taught herein will respond to appropriate curing temperatures with extensive flow of resin and fiber as well as extensive cure.

The catalysts which are used in the invention are free radical polymerization catalysts. Numerous catalysts of this type are well-known, specific catalyst selection in accordance with the invention depending largely on the desired temperature and time of operation. These catalysts retain activity for long periods in the solid flexible mass which is formed. Catalyst selection is primarily determined by the temperature at which the catalyst liberates free radicals in sufficient quantity in a reasonable time. Thus, any catalyst known to be useful for curing the plasticizer per se can be used to cure the combinations which are formulated in accordance with this invention. Generally, the preferred catalysts liberate free radicals in the range of from 120–200° C. The higher curing temperatures of 150° C. and even higher are particularly preferred to permit faster fluxing of the powder particles and faster cure as well as greater stability at room temperature. On this basis, t-butyl perbonzoate is preferred to benzoyl peroxide and 2,5-dimethyl-2,5-bis(t-butyl peroxy)hexyne-3 is particularly preferred. Azodiisobutyronitrile and like catalysts are also quite useful.

The powder compositions of the invention are illustrated in the following examples in which parts are by weight.

| Example: | Bulk polymer [1] | Polyacrylate [2] | Dioctyl phthalate | Catalyst [3] percent based on [2] |
|---|---|---|---|---|
| I | 95 | 5 | 1 | 0.25 |
| II | 90 | 10 | 1 | 0.25 |
| III | 85 | 15 | 1 | 0.25 |
| IV | 80 | 20 | 1 | 0.25 |
| V | 75 | 25 | 1 | 0.25 |

[1] Bulk polyvinyl chloride polymer, 0.8% on 80 mesh screen, 32.6% on 120 mesh screen, 62.4% on 200 mesh screen and 2.3% on 230 mesh screen, number average molecular weight 43,000, weight average molecular weight 115,000 (Product B-34 of Hooker Chemical Corporation may be used).
[2] Trimethylol propane trimethacrylate.
[3] 2,5-dimethyl-2,5-bis(t-butyl peroxy)hexyne-3.
NOTE.—Stabilizers such as dibutyl tin dilaurate and lubricants as normally used with polyvinyl chloride formulations may optionally be added.

All of the components except the bulk polymer are mixed together and then added to the bulk polymer and mixing is continued until the mix is uniformly blended. At this time, the mixtures of Examples I–IV are dry powders. Example V provided a damp powder which dried after a few weeks.

All of the mixtures cured excellently when subjected to pressure between mold patens heated to 165° C. for a period of 1–2 minutes or heated to 145° C. for 2–3 minutes. The molded products were about twice as strong in tension as ordinary polyvinyl chloride and would not break or crack when strongly impacted. These molded products, while hard and strong, can be sawed, nailed and otherwise handled like conventional timber. They can be post formed with pressure, preferably assisted with heat and, when their ability to resist deformation is exceeded, they yield and deform in the manner of metal. All of the products were more heat and solvent resistant than polyvinal chloride itself with the heat distortion temperature and solvent resistance increasing in each Example from I to V, though even Example I shows considerabl improvement.

More particularly, and while it is conceded that conventional testing is of only limited value in characterizing the new properties which are here obtained, the following conventional characteristics were obtained from the molded products of Examples I–V.

Barcol hardness—25–40
Water absorption—0.05–0.3%
Shore D hardness—83–85
Tensile strength—8800–9600 p.s.i.
Tensile elongation—2–7.2%
Tensile modulus—5–6.5 × $10^5$
Flexural modulus—5.2–7.2 × $10^5$
Notched Izod impact—0.5–1.0 ft./lbs./in.
Heat distortion at 264 p.s.i.—161–173° F.

As might be expected, the hardness, tensile strength and heat distortion temperature all increased with the increasing proportion of polyacrylate. At the same time, the tensile elongation decreases. The improvement in heat distortion temperature can be compared with a heat distortion temperature at 264 p.s.i. of 140–150° F. for conventional polyvinyl chloride products. Of course, for the conventional thermoplastic products, the heat distortion temperature is essentially the same whether a load is imposed or not and, when failure occurs, it is rapid. In the invention, the heat distortion temperature is not only increased, but the heat distortion temperature is higher when the load is removed and, when failure occurs, it occurs slowly. Thus, the improvement in heat distortion temperature is shown to be significant by the increased heat distortion temperature, but the actual improvement extends far beyond what the numbers would seem to indicate.

When 5–10% glass is added either as chopped fiber or milled glass, tensile elongation is reduced; impact resistance is increased twice or more; and heat distortion temperature is increased.

Molding the dry powders of Examples I to V at 165° C. for only 10–15 seconds produces a gel which is substantially uncured. This gel is stable for months at room temperature and cures rapidly under the same curing schedules noted for the dry powders themselves. Thus, pieces cut from the gel can be molded to form unitary products in which the individual pieces cannot be detected.

The powders of Examples I to V can be extruded using a 2/1 screw running at 30–50 revolutions per minute and a barrel temperature to within 1–2 inches of the extrusion die face up to 60–80° C. The die temperature is then raised to 150° C. to extrude a gelled and uncured product. As the die temperature is further increased, cure becomes progressively more extensive, and slowing the screw also increases the curing time and, hence, the extent of cure.

Again, and recognizing the limitation of conventional measurement technique as applied to materials possessing some thermoplastic properties and some thermosetting properties, and which are also unlike usual plastics in their physical characteristics, it is significant to compare the conventional ASTM tensile strength property of conventional plastics with the tensile strength provided in the invention. Thus, conventional plastics even when loaded with glass fiber reinforcement consistently fail to provide tensile strengths in excess of 7,000 p.s.i. Thus, the polycarbonate resin, Lexan, loaded with glass fiber to 40% has a tensile strength of 6,800 p.s.i. Similarly, fiber glass strengthened ABS resin has a tensile strength of about 4,000 p.s.i. In the invention, typical tensile strengths are 9,000–10,000 p.s.i. for molded products which are not fiber reinforced and the fiber reinforced products are stronger and possess greater impact resistance.

It is also of interest to note the difference in strength properties as the plasticizer selection is varied. In this regard, and in order to provide a more meaningful comparison, the weight ratio of bulk polyvinyl chloride to total plasticizer was maintained constant at 85/15 and with ½% of t-butyl perbenzoate being used as catalyst. The mixtures are molded to form flat sheets 4″ x 4″ x ⅛″ and these are then pressed to corrugate the same using a corrugated form having 6 bends spaced ¾″ apart. The molding was done under two different sets of conditions (160–165° C. for 2 minutes and 140–150° C. for 3 minutes). The results were essentially the same in each case. When the flat sheets are corrugated, the pressure mounts until full resistance to bending is achieved (yield point) and, the pressure mounts further until bending is completed (complete distortion). The following results were obtained.

| Plasticizer | Yield point, lbs. | Complete distortion, lbs. |
|---|---|---|
| Dioctyl phthalate | 4,000 | 6,000 |
| 50/50 Styrene/TPT [1] | 8,000 | 13,000 |
| 50/50 Vinyl toluene/TPT | 8,000 | 13,000 |
| 50/50 Dioctyl phthalate/TPT | 6,400 | 15,000 |
| TPT | 9,000 | 15,000 |

[1] Trimethylol Propane Trimethacrylate.

As can be seen, trimethylol propane trimethacrylate alone, even at an 85/15 ratio, provides enormous strength and most of this strength is maintained on 50/50 admixture with styrene or vinyl toluene. In complete contrast, when dioctyl phthalate is used either alone or in 50/50 admixture with trimethylol propane trimethacrylate, over half of the complete distortion resistance is lost. Of course, when dioctyl phthalate is used alone, larger amounts of it are needed to provide essential flexibility and the strength falls off more as the flexibility is increased.

The invention is defined in the claims which follow.

I claim:
1. A curable powder composition containing as the essential element a powder mixture comprising:
   (1) a low molecular weight polyethylenic polyester reaction product of alpha,beta-unsaturated monocarboxylic acid with an aliphatic polyhydric alcohol having a molecular weight below 600;
   (2) bulk polymerized particles of essentially homopolymeric thermoplastic polyvinyl chloride; and
   (3) free radical generating polymerization catalyst, the weight ratio of said polyester reaction product to said polyvinyl chloride being at least about 3/97 to about 25/75.
2. A composition as recited in claim 1 in which said catalyst is dissolved in said polyester reaction product and said powder is a dry powder.
3. A composition as recited in claim 1 in which said polyester reaction product contains an average of more than two unsaturated ester groups per molecule.
4. A composition as recited in claim 1 in which the weight ratio of said polyester to said polyvinyl chloride is in the range of from about 5/95 to about 25/75.
5. A composition as recited in claim 1 in which reinforcing fibers are mixed into said powder.
6. A composition as recited in claim 1 in which said polyester reaction product is the product of reaction of a polyhydric alcohol and an acid selected from the group consisting of acrylic acid, chloroacrylic acid, bromoacrylic acid, alkoxy acrylic acid, alkyl, aryl and acyl acrylic acid.
7. A composition as recited in claim 6 in which said acid is acrylic acid.
8. A composition as recited in claim 6 in which said acid is methacrylic acid.
9. A composition as recited in claim 1 in which said polyester reaction product is trimethylol propane trimethacrylate.
10. A composition as recited in claim 1 in which said powder includes from 0.5–3%, based on the weight of the mixture, of a compatible non-polymerizable plasticizer.
11. A composition as recited in claim 1 in which said polyester reaction product is essentially the only plasticizer present in said powder.
12. A composition as recited in claim 1 in which said polyester reaction product is present in admixture with monoethylenic monomer.
13. A composition as recited in claim 12 in which said monoethylenic monomer is selected from the group consisting of styrene, vinyl toluene and ortho-chlorostyrene.
14. A composition as recited in claim 1 in which said catalyst is 2,5-dimethyl-2,5-bis(t-butyl peroxy)hexyne-3.
15. A composition as recited in claim 1 in which said polymeric polyvinyl chloride is polyvinyl chloride homopolymer and said polyester reaction product is a polyacrylate or polymethacrylate of a polyhydric alcohol having more than two hydroxy groups per molecule.
16. A method of producing a tough cured product which, in comparison with unmodified polyvinyl chloride homopolymer is more rigid, has greater heat resistance and less solubility in organic solvents, comprising providing a dry room temperature stable powder thermosetting composition consisting essentially of bulk polymerized particles of essentially homopolymeric thermoplastic polyvinyl chloride having absorbed therein a low molecular weight polyethylenic polyester reaction product of alpha,beta-unsaturated monocarboxylic acid with an aliphatic polyhydric alcohol having a molecular weight below 600, and free radical generating polymerization catalyst distributed in said composition, the weight ratio of said polyester to said polyvinyl chloride being at least about 3/97 to about 25/75, and curing said composition under pressure at a curing temperature in the range of from about 120° C. to about 200° C.
17. A method as recited in claim 16 in which fibrous reinforcing material is combined with said composition to produce a fiber-reinforced product.
18. A fused substantially uncured product produced by subjecting the powder of claim 1 to pressure and heat producing a temperature in said powder of about 100–120° C. to cause the particles of said powder to coalesce into a non-porous product in the absence of significant polymerization.
19. The product produced by curing the uncured product of claim 18 at a temperature of from about 120° C. to about 200° C.
20. A method of economically producing strong and tough molded products rich in polyvinyl chloride comprising distributing the powder of claim 1 in a compression mold, subjecting said powder in said mold to consolidating pressure and heat to cure the same and then removing the so-molded piece from said mold while hot.
21. A method as recited in claim 20 in which the polyester reaction product used to form said powder contains an average of more than two unsaturated ester groups per molecule.
22. A method of compression molding the powder composition of claim 1 comprising placing the powder of claim 1 in a compression mold, applying heat and partial pressure to cause said composition to fill the mold cavity, and to gel at least the surface portions of said composi- tion, at least momentarily relieving the pressure and then applying heat with full pressure to cure said composition.

References Cited

UNITED STATES PATENTS

| | | | |
|---|---|---|---|
| 3,074,905 | 1/1963 | Douglas | 260—884 |
| 3,133,825 | 5/1964 | Rubens | 117—62 |
| 3,247,289 | 4/1966 | Sears | 260—884 |
| 3,349,046 | 10/1967 | Abell et al. | 260—2.5 |
| 3,359,193 | 12/1967 | Pinner | 204—159.17 |

SAMUEL H. BLECH, Primary Examiner

R. J. SEIBERT, Assistant Examiner

U.S. Cl. X.R.

260—17, 23, 31.8, 41, 45.75, 857